Feb. 15, 1966 J. F. QUAAS 3,235,405
FLUX-COATED WELDING ELECTRODE AND COMPOSITION
Filed Dec. 14, 1961
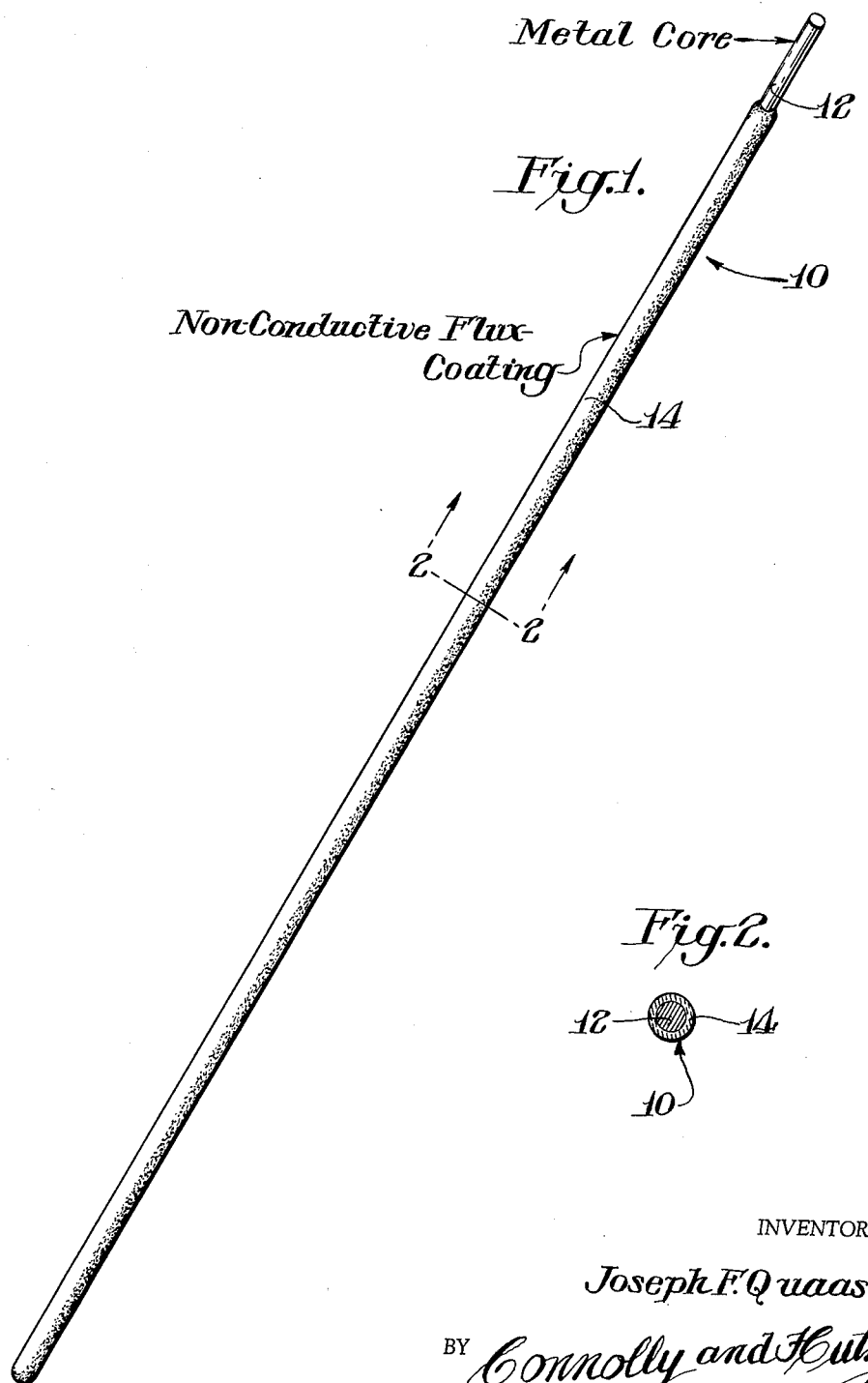
INVENTOR
Joseph F. Quaas
BY Connolly and Hutz
ATTORNEYS

United States Patent Office 3,235,405
Patented Feb. 15, 1966

3,235,405
FLUX-COATED WELDING ELECTRODE
AND COMPOSITION
Joseph F. Quaas, Island Park, N.Y., assignor to Eutectic Welding Alloys Corporation, Flushing, N.Y., a corporation of New York
Filed Dec. 14, 1961, Ser. No. 159,465
9 Claims. (Cl. 117—206)

This invention relates to a non-conductive flux coated welding electrode, and it more particularly relates to such an electrode for use on iron parent materials such as cast iron.

Most flux-coated electrodes for use upon cast iron materials incorporate relatively high percentages of carbon such as graphite. This carbon is highly reactive with any organic foreign material such as oil or grease, or oxides that might be present upon the parent material to make the deposited weld metal porous or otherwise prone to cracking and other defects. Furthermore, such a relatively high carbon content makes the flux coating conductive and prone to arcing if it happens to contact the object which is being welded. This makes such electrodes prone to destruction and liable to marring objects being welded. Such accidental grounding through the side of the electrode is very likely to occur when a weldor is working in a cramped area upon an object of complex configuration or upon an inaccessible joint.

An object of this invention is to provide a flux coating for a metallic electrode which is relatively non-conductive.

Another object is to provide such a flux-coated electrode for application to iron parent materials, and A further object is to provide such a flux-coated electrode for application to cast iron.

In accordance with this invention a relatively non-conductive flux for metallic arc electrodes includes the following constituents in the indicated ranges and examples of percentages by weight:

| Constituent | Range | Example |
|---|---|---|
| (1) Alkaline earth metal carbonate, particularly carbonates of strontium, calcium or barium | 30–65 | 55 |
| (2) Alkali or alkaline earth metal fluoride, particularly fluorspar (calcium fluoride) or sodium fluoride | 10–30 | 23 |
| (3) Metallic Deoxidizers | 2–25 | 15 |
| (4) Low Ash Carbon | 2.5–8 | 4 |
| (5) Silicious material, particularly aluminum silicate material | 1–10 | 3 |

Advantageous carbonates of constituent (1) can consist solely of any of the recited compounds or any mixture of them depending upon their availability and the particular type of service for which the coated electrode is designed. Barium carbonate, for example, is very effective in maintaining arc stability on alternating current in which a reversal of polarity occurs 60 times per second. Strontium carbonate is almost as effective as barium carbonate in this respect; however, calcium carbonate is not as effective as the others. A particular example of this flux incorporating a first constituent solely of barium carbonate is therefore particularly effective for use with alternating current.

The fluorspar (calcium fluoride) or sodium fluoride operates as a flux or scouring agent which combines with various oxides liberated during deposition to form a highly effective slag cover which eliminates and excludes oxygen from the weld deposit. Potassium and barium fluorides can also be used for this purpose.

The metallic deoxidizers, for example, may be selected from the following list of such agents or any other effective metallic deoxidizing agents which are compatible with flux, core metal and parent metals.

*Metallic deoxidizers*
(1) Ferrocolumbium
(2) Ferromanganese
(3) Ferrotitanium
(4) Ferroaluminum
(5) Ferrochromium
(6) Ferrosilicon
(7) Purer grades of metallic powders
   (a) Electrolytic manganese powder
   (b) Chromium powder
   (c) Titanium powder in various percentages with iron.

The low ash carbon can, for example, be selected from any of the following substances of this type. Its presence in the recited relatively low amounts is far less than that previously utilized for application to iron such as cast iron parent materials. Heretofore it was believed necessary to provide higher percentages of carbon to provide even burn-off of the electrode and to maintain stability on alternating current power sources. The unique formulation of this flux remarkably permits the percentage of carbon to be reduced to a minimum without adversely affecting the depositing characteristics of the electrode. In addition, the flux coating is non-conductive and thus insulating which prevents arcing through the side of the electrode and any portion of the parent material which might be accidentally contacted.

*Low ash carbon*
(1) Pure carbon
(2) Charcoal
(3) Graphite
(4) Compatible organic materials
   (a) Coal
   (b) Coke
   (c) Vinyl
   (d) Dextrin and/or sugars The aluminum silicates may comprise silica or any of the following illustrative silicates or any similar minerals or compounds embraced within the description of silicious material.

*Aluminum silicates*
(1) Bentonite
(2) Clay
(3) Mica
(4) Feldspar
(5) Pure aluminum silicates Suitable binders for this flux formulation are the water-soluble silicates such as $NaSO_3$ and $K_2SiO_4$ and mixtures thereof which are well known in the art. These silicate binders are combined in the usual amounts of, for example, 8–25% by weight of the overall formulation of active fluxing agents and binder.

Suitable cores for metallic arc electrodes for application to cast iron materials are as follows:

*Core materials*
(1) Mild steel alloy
(2) Copper base alloy
   (a) Pure copper
   (b) Aluminum bronze
(3) Nickel base
   (a) Monel
   (b) Pure Nickel
   (c) Nickel iron
(4) Low alloyed nickel bearing steel.

A flux of this type may be applied to any of these core wires by conventional processes such as painting, dipping or extrusion. A conventional electrode of this type will, for example incorporate 24% by weight of flux coating to 75% by weight of core material; and a useful electrode of this type will, for example, have a core diameter of approximately ⅛ inch and an overall diameter of, for example 0.180 inch.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention; and

FIG. 2 is a cross-sectional view taken through FIG. 1 along the line 2—2.

A particularly effecive electrode 10 of this type for welding cast iron utilizes, for example as shown in FIGS. 1 and 2, a core wire 12 of nickel iron with a non-conductive flux coating 14 of the following composition.

| Constituent: | Percent by weight |
|---|---|
| Barium carbonate | 55 |
| Flourspar | 25 |
| Ferrochromium deoxidizer | 15 |
| Low ash charcoal | 4 |
| Bentonite | 3 |

This flux composition is mixed with a silicate binder made of $NaSiO_3$ in an overall formulation which includes approximately 15% by weight of binder and 85% by weight of active fluxing agents. Such an electrode as well as those made in accordance with the alternative formulations indicated herein affords remarkably effective fluxing action and insulation as well as minimizing carbon pickup in the deposited weld material, which is particularly important when applying the core materials herein described to iron, with the exception of the copper base alloys such as pure copper and aluminum bronze which are not adversely affected by the presence of relatively great amounts of carbon. In addition, these electrodes can be applied either by alternating or direct current power sources and have excellent arc stability on alternating current. The deposited welds therefore are remarkably ductile and free of porosity which minimizes any cracking tendencies. The metallic deoxidizer content also cooperates with the carbonates to maintain arc stability.

The carbonates also release carbon dioxide at arcing temperatures which provides a neutral atmosphere within the arcing area during transfer and deposition of the molten weld metal in globular form. The resultant oxide that is also formed is the oxide of the respective metal incorporated in the carbonate which also forms an effective portion of the slag blanket or cover. A flux-coated electrode of this type therefore has excellent depositing characteristics and arc stability and even burn-off in conjunction with effective insulation of the side of the electrode which prevents any accidental arcing through it. It may therefore be utilized in welding in cramped quarters and introduced within restricted access conditions to joints without danger of arcing if the coated side should accidentally contact the parent material. Furthermore, this type of coated electrode also has the important advantage of minimizing the presence of carbon which tends to combine with organic materials to cause porosity or other defects in the deposited weld metal. This avoids any tendency to make the resultant weld susceptible to cracking or failure, which is highly important when applying core alloys other than the copper type.

What is claimed is:

1. A non-conductive flux coating composition for a metallic arc electrode consisting essentially of the following constituents in the indicated ranges of percentages by weight together with a suitable binder:

| Constituent: | Range |
|---|---|
| (1) Alkaline earth metal carbonates | 30–65 |
| (2) A fluoride of a metal selected from the group consisting of alkali and alkaline earth metals | 10–30 |
| (3) Metallic deoxidizer | 2–25 |
| (4) Low ash carbon | 2.5–8 |
| (5) Silicious material | 1–10 |

2. A flux coating as set forth in claim 1 wherein said binder is a silicate binder, and it is combined with said flux in a percentage ranging approximately from 8–25% of the overall combination of said flux and binder.

3. A non-conductive flux-coated electrode comprising the flux as set forth in claim 1 coated upon a core metal having a composition compatible for application to iron.

4. A non-conductive flux-coated electrode as set forth in claim 3 wherein said core metal is selected from the group consisting of mild steel alloys, copper base alloys, nickel base alloys, and low alloyed nickel bearing steel.

5. A flux coating as set forth in claim 1 wherein said fluoride is an alkali metal fluoride.

6. A flux coating as set forth in claim 1 wherein said fluoride is an alkaline earth metal fluoride.

7. A flux as set forth in claim 1 wherein said alkaline earth metal carbonate is a barium carbonate.

8. A non-conductive flux-coating for a metallic arc electrode consisting essentially of the following constituents in the indicated ranges of percentages by weight together with a suitable binder:

| Constituent: | Range |
|---|---|
| (1) Barium carbonate | 30–65 |
| (2) Fluorspar | 10–30 |
| (3) Metallic deoxidizer | 2–25 |
| (4) Low ash carbon | 2.5–8 |
| (5) Aluminum silicate material | 1–10 |

9. A non-conductive flux coating as set forth in claim 8 wherein said binder is a silicate binder, and it is combined wtih said flux in a percentage ranging approximately from 8–25% of the overall combination of said flux and binder.

References Cited by the Examiner

UNITED STATES PATENTS

| 2,626,339 | 1/1953 | Wasserman | 148—26 X |
| 2,817,751 | 12/1957 | Phillips et al. | 117—206 X |
| 2,870,047 | 1/1959 | Kee | 117—202 |

RICHARD D. NEVIUS, *Primary Examiner.*